Patented July 13, 1926.

1,592,296

UNITED STATES PATENT OFFICE.

CARLETON ELLIS, OF MONTCLAIR, NEW JERSEY.

RESINOUS BODIES FROM A PHENOL, FURFURAL, AND ANOTHER ALDEHYDE AND PROCESS OF MAKING THE SAME.

No Drawing. Application filed September 11, 1922, Serial No. 587,580. Renewed January 30, 1924.

The present invention relates to a resinous complex and to a process of making same, and the invention will be described in some of the examples with particular reference to a resinous complex produced from furfural, acetaldehyde and a phenolic body, such as ordinary phenol although homologues thereof, such as the cresols, cresylic acid and other analogous phenols, capable of reacting to form resins may also be used, within the scope of the invention.

The reaction of furfural with ordinary phenol in the presence of an acid catalyst yields infusible rubbery substances unless the phenol be greatly in excess. The removal of this great excess of phenol is troublesome and in the present invention a procedure is set forth which obviates such treatment except possibly to a very slight degree.

Although an aldehyde, furfural has peculiarities which distinguish it from all other common aldehydes. It possesses the furfurane group which makes it comparable in some respects with cumaron. It has some properties in common with benzaldehyde. The preparation of a fusible resin by the reaction between furfural and phenol is a difficult procedure. Alkalies if properly used, and especially mild fixed alkalies such as the carbonates of the alkali metals, are capable of acting as catalyzers to bring about the reaction to form a fusible resin. Sodium carbonate or potassium carbonate are illustrations of substances which may be used for the purpose.

Thus 10 pounds of phenol, 7½ pounds of furfural and 1 pound of powdered potassium carbonate were heated under a reflux condenser to 145–155° C. for 3 hours. A fusible soluble resin was formed. As this contained some unreacted phenol and furfural which preferably should be removed on account of the odor, the resin was placed in an oil bath heated to 160–170° C. and blown with steam for 3 hours to deodorize. At this temperature the product was at first in a very liquid or freely flowing condition but became more viscous toward the end of the operation. The mass was cooled and the resin obtained was sufficiently solid to be ground to a powder. On standing for a few days the particles were found to stick together somewhat. This resin was freely soluble in alcohol.

In testing this resin for molding purposes 100 parts each of the resin and wood flour, 10 parts of hexamethylenetetramine and ½ part of stearic acid were incorporated, the wood flour being added to a solution of the other ingredients, in alcohol. On evaporation of the alcohol in a vacuum dryer, a molding powder was obtained. When this mixture was molded in a hydraulic press molded articles were obtained which were insoluble and infusible but which stuck to the mold so badly that in spite of repeated endeavor the articles could not be removed from the mold without marring their surfaces. For making printing plate impressions where very thin paper or tin foil is placed between the mold and the molding composition, sticking of course does not occur but when the molding composition is forced into (unlined) steel molds such as are ordinarily used for making articles of electrical insulation etc. an extraordinary degree of sticking manifests itself. Increase in the amount of the stearic acid lubricant causes the surface to be spotted probably through exudation of the lubricant. Nitronaphthalene does not prevent sticking. The addition of a water-insoluble soap or so called "metallic soap" such as aluminum palmitate, zinc stearate or similar substance has however a decided effect in reducing the trouble from sticking. 7 per cent or less of aluminum palmitate (based on the weight of the resin) overcomes the sticking. The palmitate is preferably added by grinding in the ball mill with the molding mixture set forth above but may be incorporated in other ways. While this example mentions the use of 7% of the palmitate, it will be understood that much smaller amounts of the metallic soaps can be used, as indicated in some of the examples given below.

Such a composition has the disadvantage of being slightly affected by water, that is when a molded piece is placed in water the surface is slightly roughened. When the resin is mixed with the filler and other materials are added by heating and working on a hot plate or for example by passing through differential rolls, the molded article does not spot when treated with water. A very satisfactory composition may be made from 60 parts of the resin and 40 parts of filler.

The time of cure, that is the rate at which the reaction progresses in the mold to form a hard molded article, is not as rapid as desired, however, and the addition of a catalyzer such as caustic potash is desirable in some cases.

Thus the following mix may be employed. Resin prepared with the potassium carbonate catalyst described above 75 parts by weight, hexamethylenetetramine 7.5 parts, stearic acid ⅜ part, nigrosine 1.5 parts, caustic potash 1.5 parts, denatured alcohol 75 parts. The mixture is aded to 75 parts of wood flour, thoroughly admixed and dried in a vacuum dryer for 3 hours at 28 inches vacuum. The temperature of the mixture finally reaching about 95° C. The dried composition was ground in a ball mill with 5.25 parts aluminum palmitate and on molding a first sample was found to blister, so the remainder of the composition was dried for 1 hour longer to remove all traces of the solvent.

Molding tests made at 350° F. (177° C.) and 1000 pounds pressure gave a cure in 5 minutes which left the mold without any indication of sticking and produced a hard and strong molded article.

The complete drying of the composition when a solvent is used to impregnate the wood flour filler, asbestos or other mineral or organic filler which is employed, is important. Preferably drying should be carried beyond the point where the solvent is eliminated, in order to get a certain degree of reaction which affords a better cure. In this way there is less tendency to the formation of blisters.

In making up the fusible resin described above the proportions stated are desirable as increase in the amount of furfural together with longer heating is likely to form an infusible resin. The resin obtained in accordance with the foregoing may have furfural added to it say to the batch stated 2½ pounds of furfural is added and is heated for 4 hours longer, the presence of potassium carbonate not being required. This affords an infusible resin. Compositions of this character, that is mixtures of the fusible furfural phenol resin and furfural, may be employed for molding purposes.

A more complex resinous product which is desirable for molding purposes, may be obtained by reacting on phenol with acetaldehyde and furfural, which in some instances may be carried out separately, that is an acetaldehyde resin and a furfural resin are separately prepared and subsequently mixed. Preferably however, a peculiar complex forming the preferred product may be obtained by reacting on phenol with acetaldehyde and then with furfural. Such a complex constitutes the preferred form of the present invention.

100 parts of phenol, 50 parts of para acetaldehyde and .8 part sulphuric acid diluted with a small amount of water are mixed and heated in an oil bath for 4 hours to form a resin, (i. e. a partially resinified phenolic material). It is noted that in this first stage (i. e. partial resinification in the presence of an acid catalyst) I do not use any furfural. This intermediate product is blown with steam to remove any unreacted materials, neutralized with sodium carbonate or any other suitable alkali, the neutralizing agent removed and the resin heated to drive off any water which may be present. This procedure furnishes a soft garnet-like resin. In the foregoing treatment a reflux condenser was used and a greater amount of the acetaldehyde was required than would be the case when the operation is carried out in an autoclave, (due to some loss of acetaldehyde). Also a lesser amount of the acid catalyst would be required when working in an autoclave especially on the large scale as the heat of reaction would tend to increase its vigor. Acetaldehyde differs from formaldehyde in not condensing with phenol in the presence of basic substances. Alkalies, which bring about resinifying reaction between formaldehyde and phenol do not bring about appropriate reaction between acetaldehyde and phenol even when heated under pressure to produce a satisfactory resin.

25 parts by weight of the acetaldehyde resin, 50 parts of phenol furfural resin previously described, 7½ parts of hexamethylenetetramine, 75 parts denatured alcohol and ⅜ part stearic acid were mixed and 75 parts of wood flour impregnated with this mixture. It was dried for 3 hours in a vacuum dryer and ground with several per cent of aluminum palmitate. Again it was dried in a vacuum dryer for about an hour and samples molded for 5 minutes at 350° F. (177° C.) at 1000 pounds pressure. The sample left the mold as a hard disc without signs of sticking.

Furfural phenol resin of a fusible type does not melt sharply but softens through a considerable range which is not as satisfactory for molding purposes as a resin which melts sharply so as to become a thin liquid at a given temperature. In the latter case the molding composition will run freely and will flow to all parts of the mold, producing a sharp impression, which is desired. The combination of acetaldehyde and furfural with phenol to a peculiar complex gives a resinous composition which has a better degree of liquidity during molding than the more viscous furfural phenol resin and produces better molded articles. As the acetaldehyde does not combine (to form a suitable resin) in the presence of an alkaline substance and as the furfural in the presence of an acid catalyst goes over into a rubbery infusible material, the three components cannot be simply mixed and reacted jointly to advantage but the reaction may be carried out progressively as for example the acetaldehyde may be allowed to react on an excess of phenol in the presence of a sulphuric acid catalyst and when reaction is complete the mixture (containing partially resinified phenol), may be rendered alkaline with a fixed alkali such as sodium or potassium carbonate, and furfural added to combine with the acetaldehyde resin and phenol to form a complex the properties of which indicate is neither a furfural resin nor an acetaldehyde resin but a peculiar composite. Or the procedure may be reversed, the furfural being first caused to combine followed by reaction of the acetaldehyde, although in this case the difficulty of preparation is greater. Irrespective of which aldehyde acts first, the reaction should be "successive" (one after the other) in either order, with appropriate catalysts in the two stages.

A resinous complex may be made by treating 200 parts by weight of phenol (30 mols.) with 35 parts of paraldehyde (about 10 mols. based on the simple formula $C_2H_4O$), employing .2 to .4 per cent of sulphuric acid as a catalyst. Reaction is allowed to take place spontaneously or by gentle heating and when the reaction has progressed well along toward completion, 12 parts of potassium carbonate are added and 75 parts of furfural (about 11 mols.), and the composition heated as in the manner described in preparing the furfural resin first mentioned. The resinous complex is blown with steam to eliminate any unresinified substances. This may be mxied with filler and hexamethylenetetramine if desired. It will be noted that a fixed alkali forms the catalyst for the furfural reaction, (as distinguished from "volatile alaklies," ammonia, methyl amine, etc.) which do not produce so satisfactory results, but tend to give an undesirable tacky product. The resin made by the preferred process, after blowing with steam is essentially free from tackiness. It is also soluble in alcohol, and can be used in this manner for impregnating fillers to be used in molding. In molding, it does not stain the polished surfaces of the steel molds, i.e., is "stainless" as the term is commonly used in this art.

The term "acetaldehyde" as employed in the appended claims is of course intended to embrace the simple substance as well as its polymer, para-acetaldehyde.

I claim:—

1. A process of making a resinous complex which comprises reacting on a phenol with such an amount of acetaldehyde as to form therewith a readily fusible resin containing an excess of phenol and reacting with furfural in amount capable of reacting with such excess of phenol, such two reactions being conducted in the presence, respectively, of an acid catalyst and a mild fixed alkali catalyst.

2. A process which comprises reacting on a phenol with such an amount of acetaldehyde as to form therewith a fusible soluble resin containing an excess of phenol, and thereafter reacting on the resulting material with furfural in amount capable of forming a fusible soluble resin, such two reactions being conducted, respectively, in the presence of an acid catalyst and a mild fixed alkali catalyst.

3. A process of making a resinous complex which comprises reacting on a fusible soluble partially resinified phenolic material, constituting a reaction product of a phenol and an aldehyde other than a furfural compound, with such an amount of furfural, in the presence of a non-volatile mild alkali, as to form a fusible soluble resinous complex.

4. A process of making a resinous complex which comprises reacting on a fusible soluble partially resinified phenolic material, constituting a reaction product of a phenol and an aldehyde other than a furfural compound with such an amount of furfural, in the presence of a non-volatile mild alkali, as to form a fusible soluble resinous complex, which upon addition of a small percentage of hexamethylene tetramine and heating, will be converted into an insoluble infusible product.

5. A process which comprises reacting successively on a phenol with acetaldehyde and furfural, in the presence respectively of an acid and a mild fixed alkali, the acetaldehyde and furfural together being equivalent in combining power with the phenol, to from a fusible, soluble, moldable resin.

6. A process which comprises reacting upon 30 mols. of a phenol with about 10 mols. of acetaldehyde in the presence of an acid catalyst, and thereafter reacting on the intermediate product with about 11 mols. of furfural in the presence of a mild fixed alkali to form a resinous complex.

7. The process of making a resinous material adapted for molding purposes which comprises reacting on a phenolic body successively and in the order stated, with acetaldehyde and furfural in the presence of an acid and a mild fixed alkali catalyst respectively; and conducting the reaction until a moldable fusible resin is obtained.

8. A process of making a resin which comprises reacting upon 30 mols. of a phenol with about 10 mols. of acetaldehyde in the presence of an acid catalyst, making the mass alkaline with a mild fixed alkali, adding about 11 mols. of furfural and maintaining the mixture under reacting conditions until all the phenol has combined and until a sample of the cooled resin product when freshly made, is fusible and capable of being molded.

9. A composition comprising the fusible resinous reaction product of a phenol, acetaldehyde and furfural.

10. A composition comprising the fusible resinous reaction products of phenol, acetaldehyde and furfural, incorporated with a small proportion of hexamethylenetetramine.

11. A process of making a resinous complex which comprises reacting on a phenol with such an amount of acetaldehyde as to form therewith a readily fusible resin containing an excess of phenol and reacting with furfural in amount capable of reacting with such excess of phenol, such two reactions being conducted in the presence, respectively, of an acid catalyst and a fixed alkali catalyst.

12. A process which comprises reacting on a phenol with such an amount of acetaldehyde as to form therewith a fusible soluble resin containing an excess of phenol, and thereafter reacting on the resulting material with furfural in amount capable of forming a fusible soluble resin, such two reactions being conducted, respectively, in the presence of an acid catalyst and a fixed alkali catalyst.

13. A process of making a resinous complex which comprises reacting on a fusible soluble partially resinified phenolic material, constituting a reaction product of a phenol and an aldehyde other than a furfural compound, with such an amount of furfural, in the presence of a non-volatile alkali, as to form a fusible soluble resinous complex.

14. A process of making a resinous complex which comprises reacting on a fusible soluble partially resinified phenolic material, constituting a reaction product of a phenol and an aldehyde other than a furfural compound with such an amount of furfural, in the presence of a non-volatile alkali, as to form a fusible soluble resinous complex, which upon addition of a small percentage of hexamethylene tetramine and heating, will be converted into an insoluble infusible product.

15. A process which comprises reacting successively on a phenol with acetaldehyde and furfural, in the presence respectively of an acid and a fixed alkali, the acetaldehyde and furfural together being equivalent in combining powder with the phenol, to form a fusible, soluble, moldable resin.

16. A process which comprises reacting upon 30 mols. of a phenol with about 10 mols. of acetaldehyde in the presence of an acid catalyst, and thereafter reacting on the intermediate product with about 11 mols. of furfural in the presence of a fixed alkali, to form a resinous complex.

17. The process of making a resinous material adapted for molding purposes which comprises reacting on a phenolic body successively and in the order stated, with acetaldehyde and furfural in the presence of an acid and a fixed alkali catalyst respectively, and conducting the reaction until a moldable fusible resin is obtained.

18. A process of making a fusible moldable resin which comprises reacting upon 30 mols. of a phenol with about 10 mols. of paraldehyde in the presence of an acid catalyst, making the mass alkaline with a fixed alkali, adding about 11 mols. of furfural and maintaining the mixture under reacting conditions until all the phenol has combined and until a sample of the cooled resin product when freshly made, is fusible and readily moldable.

CARLETON ELLIS.